United States Patent [19]

Maucher

[11] Patent Number: 4,708,230

[45] Date of Patent: Nov. 24, 1987

[54] DECLUTCHING DEVICE

[75] Inventor: Paul Maucher, Sasbach, Fed. Rep. of Germany

[73] Assignee: Luk Lamellen und Kupplungsbau GmbH, Bühl, Fed. Rep. of Germany

[21] Appl. No.: 910,284

[22] Filed: Sep. 17, 1986

Related U.S. Application Data

[63] Continuation of Ser. No. 592,232, Mar. 22, 1984, abandoned.

[30] Foreign Application Priority Data

Mar. 24, 1983 [DE] Fed. Rep. of Germany ....... 3310630

[51] Int. Cl.$^4$ ............................................. F16D 23/14
[52] U.S. Cl. ..................................................... 192/98
[58] Field of Search .................. 192/9 B, 89 B, 11 DB

[56] References Cited

U.S. PATENT DOCUMENTS

| | | | |
|---|---|---|---|
| 3,631,954 | 1/1972 | Coaley | 192/98 |
| 3,744,607 | 7/1973 | Hausinger et al. | 192/98 |
| 4,013,327 | 3/1977 | Kunkel et al. | 192/98 |
| 4,080,019 | 3/1978 | Flaissier et al. | 192/98 |
| 4,099,065 | 7/1978 | Ernst et al. | 192/98 |
| 4,142,618 | 3/1979 | Fortaine et al. | 192/98 |
| 4,238,018 | 12/1980 | Maucher | 192/98 |
| 4,243,130 | 1/1981 | Vinel et al. | 192/98 |
| 4,261,625 | 4/1981 | Renaud | 192/98 |
| 4,434,882 | 3/1984 | Olschewski et al. | 192/110 B |
| 4,437,556 | 3/1984 | Brandenstein | 192/98 |
| 4,579,211 | 4/1986 | Renaud | 192/98 |

Primary Examiner—Samuel Scott
Assistant Examiner—H. A. Odar
Attorney, Agent, or Firm—Peter K. Kontler

[57] ABSTRACT

A device for disengaging the friction clutch of a motor vehicle wherein a sleeve is movable along a tubular guide under the action of two arms of an actuating fork and wherein the sleeve has two platforms disposed diametrically opposite each other and serving to receive motion from the respective arms so that a bearing on the sleeve can engage the prongs of the diaphragm spring in the clutch. The sleeve is formed with an internal surface an annular section of which flares toward one axial end of the sleeve so as to allow the sleeve to rock in a plane including the axis of the sleeve and halving the platforms. Such design of the internal surface of the sleeve ensures that the latter can change its orientation with reference to the guide in order to enable both arms to simultaneously engage the respective platforms in spite of manufacturing tolerances in connection with the making of the sleeve and/or fork and/or inaccurate mounting of the fork relative to the guide and/or thermally and/or otherwise induced deformation of parts of the device. Simultaneous engagement of both arms with the respective platforms prevents jamming of the sleeve as well as premature wear upon and/or excessive resistance to movement of the sleeve to disengaging or retracted position.

19 Claims, 5 Drawing Figures

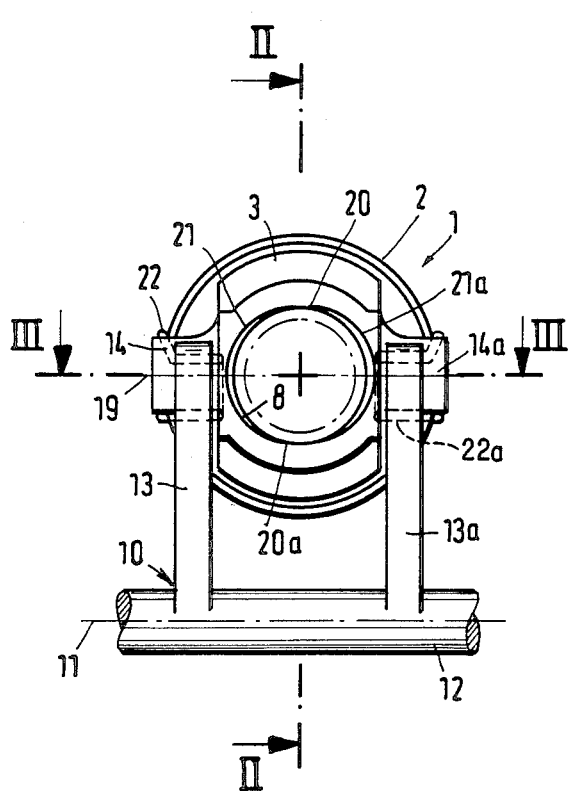
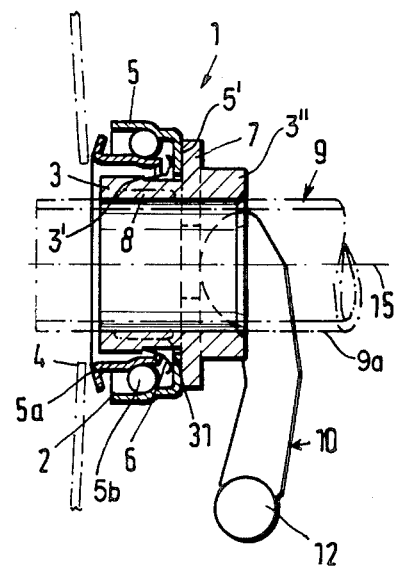
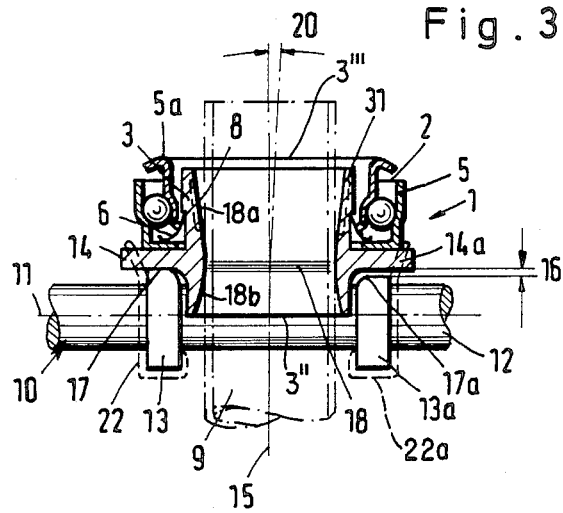

4,708,230

DECLUTCHING DEVICE

The application is a continuation of application Ser. No. 592,232 filed Mar. 22, 1984 now abandoned.

BACKGROUND OF THE INVENTION

The present invention relates to declutching devices, especially to devices for disengaging friction clutches of motor vehicles. More particularly, the invention relates to improvements in declutching devices of the type wherein the disengaging unit comprises a sleeve which is movable along an elongated guide and carries an antifriction bearing one race of which can be moved into engagement with the prongs of a diaphragm spring in the friction clutch of a motor vehicle or the like.

It is known to provide the sleeve of the disengaging unit with two motion receiving portions which are disposed diametrically opposite each other and can be engaged by the arms of a bifurcated actuating member in the form of a fork. The arms straddle the guide for the sleeve and are pivoted into motion transmitting engagement with the respective motion receiving portions of the sleeve in order to shift the latter longitudinally of the guide. The sleeve is mounted on the guide for axial movement with a minimum of play and the guide is normally an elongated cylindrical pipe or tube which surrounds the input shaft of the change-speed transmission of the motor vehicle. When the clutch is engaged, it transmits torque from the crankshaft of the engine to the input shaft of the transmission. In order to disengage the clutch, the sleeve is moved axially of the guide by the pivoting arms of the actuating fork to thereby deform the diaphragm spring of the clutch with the result that the pressure plates are disengaged from the friction linings on the clutch disc which latter receives torque from the crankshaft.

The arms of the fork are normally mounted for pivotal movement about a fixed axis. In many motor vehicles, the fixed pivot axis for the fork extends at right angles to the axis of the reciprocable sleeve and is defined by a shaft which is journalled in the case of the change-speed transmission. In such declutching devices, the wear upon the sleeve and/or fork is quite pronounced, especially because the sleeve is often engaged and shifted by a single arm of the fork. This is due to unavoidable machining tolerances, not only as regards the making of the fork but also as concerns the treatment of those portions of the sleeve which receive or are supposed to receive motion from the arms. If one of the arms is twisted or otherwise deformed, it is likely to engage the corresponding motion receiving portion of the sleeve ahead of the other arm which latter is then held out of contact with the associated motion receiving portion. Consequently, the sleeve is likely to jam or to offer a very pronounced resistance to axial movement along its guide. The just discussed phenomena will develop in the majority of disengaging or declutching devices, i.e., it is rather infrequent that both arms of the fork engage the respective motion receiving portions of the sleeve at the same instant and to the same extent. Pronounced frictional engagement between the sleeve and its guide is undesirable because it adversely affects the disengaging operation and also because the return movement of the sleeve to its starting position is equally unpredictable. Moreover, the useful life of the sleeve and/or guide is short, especially if the sleeve is made of a synthetic plastic material. The same applies when the component parts of the declutching device are mass-produced elements consisting of sheet metal or the like.

In order to compensate for manufacturing tolerances and/or for deformation of the fork and/or sleeve subsequent to assembly, it was already proposed to provide an insert between each arm of the fork and the respective motion receiving portion of the sleeve and to secure the inserts to the associated arms by way of elastic clamps. Each insert further comprises a relatively narrow web which abuts against the non-rotating race of the antifriction bearing on the sleeve at a position which is angularly offset by approximately 90 degrees relative to the corresponding elastic clip. The inserts are free to pivot about their respective webs to compensate for manufacturing tolerances and to thus ensure the application of force to both motion receiving portions of the sleeve.

A drawback of such declutching devices is that the inserts constitute additional component parts which contribute to initial cost of the declutching devices. Moreover, installation of such inserts in the declutching devices is time consuming and the cost of inserts is rather high.

OBJECTS AND SUMMARY OF THE INVENTION

An object of the invention is to provide a novel and improved declutching device which ensures satisfactory and simultaneous engagement between both arms of an actuating fork and the sleeve of the declutching device even though the transmission of motion need not take place by way of separately produced inserts.

Another object of the invention is to provide a declutching device which is constructed and assembled in such a way that unavoidable machining tolerances cannot adversely influence the transmission of motion from the actuating fork to the sleeve and/or the movements of the sleeve along its guide.

A further object of the invention is to provide a declutching device with a novel and improved sleeve which receives motion from the actuating means and serves to disengage the clutch, either directly or by way of an antifriction bearing.

An additional object of the invention is to provide a very simple, inexpensive but highly effective declutching device which can be used in conjunction with existing clutches as a superior substitute for heretofore known declutching devices.

A further object of the invention is to provide a declutching device whose useful life is longer than that of conventional devices and which is more reliable and less prone to malfunction than such conventional devices.

Still another object of the invention is to provide a novel and improved antifriction bearing for use in the above outlined declutching device.

An additional object of the invention is to provide a novel and improved method of transmitting motion from the actuating fork of a declutching device to the diaphragm spring of a friction clutch in a motor vehicle or the like.

The invention resides in the provision of a declutching device, especially for the friction clutches of motor vehicles. The improved declutching device comprises an elongated guide having an external surface whose contour is constant as considered in the longitudinal direction of the guide (for example, such guide can constitute an elongated tubular member having a cylindrical external surface of constant diameter), and a disengaging unit comprising a sleeve which is movable longitudinally of the guide and has two motion receiving portions disposed at least substantially diametrically opposite one another and an internal surface which surrounds the guide with freedom of rocking movement at least substantially exclusively in a predetermined plane including the axis of the sleeve and intersecting the two motion receiving portions. The declutching device further comprises actuating means including two arms which are arranged to move the sleeve axially by way of the motion receiving portions. Rockability of the sleeve in the aforementioned plane enables each arm of the actuating means to engage the respective motion receiving portion even if the two motion receiving portions and/or the two arms are not disposed at the same level, as considered in the axial direction of the sleeve. The actuating means is preferably pivotable about an axis which is at least substantially normal to the axis of the sleeve, and the arms of the actuating means straddle the guide. The disengaging unit preferably further comprises an antifriction bearing including a first race which is non-rotatably mounted on the sleeve, a second race which is coaxial with and is rotatable relative to the first face, and balls, rollers or otherwise configurated rolling elements between the two races.

In accordance with a presently preferred embodiment of the invention, the internal surface of the sleeve includes a first annular section which is closely adjacent to the external surface of the guide and a second annular section which is adjacent to the first section and has first and second portions which diverge axially of the sleeve in a direction away from the first section and non-divergent third and fourth portions which alternate with the first and second portions, as considered in the circumferential direction of the sleeve. The predetermined plane intersects and preferably halves the first and second portions of the second section. The sleeve is rockable relative to the guide in the region of the first annular section whereby the first and second portions of the second section permit rocking of the sleeve in the predetermined plane whereas the third and fourth portions of the second section prevent rocking of the sleeve in a second plane which is normal to the predetermined plane and includes the axis of the sleeve. The first and second portions of the second annular section can constitute parts of a conical frustum and the distance between the third and fourth portions of the second section is at least substantially constant to thereby prevent rocking of the sleeve in the aforementioned second plane. In other words, the configuration of the third and fourth portions of the second section can at least substantially conform to the contours of adjacent portions of the external surface of the guide. In accordance with one presently preferred embodiment of the invention, the first and second portions of the second section have or can have a substantially semicircular cross-sectional outline and the third and fourth portions of the second section are substantially flat and substantially parallel to each other.

The axial length of the first annular section is preferably a small or minute fraction of the axial length of the second annular section. For example, the axial length of the first annular section can be less than 25 percent and even less than ten percent of the axial length of the second annular section. The distance between the motion receiving portions and a selected end face of the sleeve can equal or approximate the distance between such end face and the first annular section of the internal surface of the sleeve.

The internal surface of the sleeve can include a third annular section which is separated from the second annular section by the first annular section and which can be a mirror image of the second annular section with reference to a plane that is normal to the axis of and intersects the sleeve in the region of the first annular section. Thus, the third annular section can include first and second portions which diverge axially of the sleeve in a direction away from the first annular section and the predetermined plane intersects (and preferably halves) the first and second portions of the third annular section. This ensures that the third annular section cannot interfere with rocking of the sleeve in the predetermined plane.

A portion of or the entire first and/or second annular section of the internal surface of the sleeve can be grooved, and the grooves preferably extend in parallelism with the axis of the sleeve.

The aforementioned antifriction bearing is preferably of the self-centering type. To this end, one race of the bearing is mounted with freedom of swiveling movement with reference to the sleeve. This enables the bearing to assume an optimum position for proper engagement with the radially or substantially radially extending prongs of the diaphragm spring in a friction clutch which is to be disengaged in response to axial movement of the sleeve in a given direction along the external surface of the guide. The sleeve can be provided with a radially outwardly extending flange and a ring can be inserted between such flange and a collar of the one race with freedom of radial movement relative to the sleeve. The ring and the collar of the one race can swivel relative to the flange and/or the collar of the one race can swivel relative to the ring in order to ensure that the bearing can be automatically centered by the prongs of the diaphragm spring.

The novel features which are considered as characteristic of the invention are set forth in particular in the appended claims. The improved declutching device itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an end elevational view of a declutching device which embodies one form of the invention and wherein the sleeve of the disengaging unit has a smooth internal surface;

FIG. 2 is a central vertical sectional view as seen in the direction of arrows from the line II—II of FIG. 1;

FIG. 3 is a horizontal sectional view as seen in the direction of arrows from the line III—III of FIG. 1;

DESCRIPTION OF THE PREFERRED EMBODIMENTS

Figure 4:
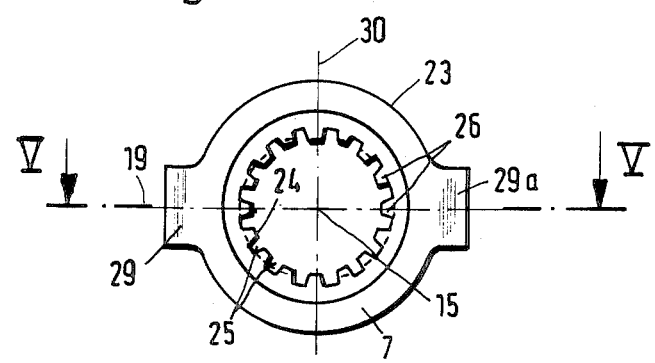
FIG. 4 is an end elevational view of the sleeve of the disengaging unit in a modified declutching device.

Referring first to FIGS. 1 to 3, there is shown a declutching device 1 which comprises an elongated tubular guide 9 (indicated by phantom lines) having a cylindrical external surface 9a of constant diameter, an actuating device or fork 10, and a clutch disengaging unit comprising a relatively short sleeve 3 and an antifriction bearing 2 which is attached to and shares the axial movements of the sleeve 3 along the guide 9. The purpose of the declutching device 1 is to selectively disengage a clutch, e.g., the friction clutch of a motor vehicle. Such friction clutches normally comprise a diaphragm spring with radially inwardly extending prongs or fingers 4 (indicated in FIG. 2 by phantom lines) whose tips can be depressed by the inner race 5a of the bearing 2 in order to engage or disengage the clutch. Clutches of the type capable of being disengaged by the device 1 of FIGS. 1 to 3 are disclosed, for example, in commonly owned U.S. Pat. No. 4,368,810 granted Jan. 18, 1983 to Paul Maucher et al. The disclosure of this patent is incorporated herein by reference.

The outer race 5 of the bearing 2 is radially movably mounted on the smaller-diameter front portion of the sleeve 3 and has an inwardly extending annular collar 5' abutting against the respective side of a radially outwardly extending flange 7 of the collar 3. An annular spring 6 is provided to maintain the collar 5' in frictional engagement with the flange 7 and to thus ensure that the outer race 5 does not rotate with reference to the sleeve 3. The left-hand end face of the spring 6, as viewed in FIG. 2, reacts against an external annular shoulder 3' of the sleeve 3. The flange 7 need not constitute a circumferentially complete annulus, as long as it can provide an adequate abutment for the collar 5'. The spherical or otherwise configurated antifriction rolling elements between the races 5 and 5a of the bearing 2 are shown at 5b. The race 5a rotates relative to the race 5, at least when it is engaged by the orbiting prongs 4 of the diaphragm spring.

The sleeve 3 has a specially designed internal surface 8 which surrounds the external surface 9a of the guide 9 and is configured with a view to ensure that the sleeve can rock relative to the guide in a predetermined plane, namely in the plane of FIG. 3 and at right angles to the plane of FIG. 2. Such rockability of the sleeve 3 relative to the guide 9 is desirable for the following reasons: The sleeve 3 has two motion receiving portions or platforms 14 and 14a which are disposed at least substantially diametrically opposite each other, i.e., at the opposite sides of the axis 15 of the guide 9 which, in certain angular positions of the sleeve 3, also constitutes the axis of the sleeve. As a rule, the exposed surfaces of the platforms 14, 14a (namely, the surfaces which face the observer of FIG. 1) are disposed at the same distance from the end face 3" of the sleeve 3. These platforms are to be contacted and displaced by the arms 13, 13a of the actuating fork 10. The latter is rigidly connected to or integral with a shaft 12 whose axis 11 is normal to the axis 15 of the guide 9. If the sleeve 3 were not free to rock in the plane of FIG. 3, and if the positions of the arms 13, 13a were such that one (e.g., 13) of these arms would engage the respective platform (14) while the other arm (13a) would be separated from the other platform (14a) by a wide or narrow clearance (note the gap 16 in FIG. 3), the fork 10 would tend to tilt the sleeve 3 in response to each counterclockwise movement of the shaft 12 (as viewed in FIG. 2) and the sleeve 3 would offer a pronounced resistance to axial movement along the guide 9. This could interfere with predictable declutching and would or could also interfere with predictable return movement of the sleeve 3 to its retracted position, i.e., in a direction away from the prongs 4 of the diaphragm spring. The development of a gap 16 can be attributed to inaccuracies in machining of the arms 13, 13a and/or to inaccuracies in machining of the platforms 14, 14a and/or to subsequent thermally and/or otherwise induced deformation of the fork 10 and/or sleeve 3 and/or to the absence of exact perpendicularity between the axes 11 and 15. The arms 13, 13a straddle the guide 9 and that portion of the sleeve 3 which extends between the end face 3" and the flange 7. The platforms 14, 14a can constitute integral parts of the flange 7. The guide 9 surrounds a shaft which is the input shaft of a change-speed transmission receiving torque from the engine of the motor vehicle when the clutch including the prongs 4 is engaged, i.e., when the crankshaft of the engine is free to drive the input shaft. The transmission transmits torque to the wheels of the motor vehicle in a manner not forming part of the invention. The shaft 12 which pivots the fork 10 is preferably mounted in the case of the change-speed transmission, preferably at a level below the tubular guide 9 as actually shown in FIGS. 1 and 2.

The internal surface 8 of the sleeve 3 has a relatively short first annular section 18 which closely follows the contour of the adjacent portion of the external surface 9a of the guide 9 and where the sleeve 3 is adapted to rock relative to the guide in the plane of FIG. 3. The first annular section 18 is a cylindrical surface whose diameter need not appreciably exceed the diameter of the external surface 9a to thus ensure that the portion of the sleeve 3 surrounding the annular section 18 cannot wobble relative to the surface 9a as considered in the radial direction of the guide 9. The internal surface 8 of the sleeve 3 further comprises a much longer second annular section 18a which extends between the annular section 18 and the front end face 3''' of the sleeve 3. The axial length of the second annular section 18a is several times (e.g., between four and twenty times) the axial length of the annular section 18. The annular section 18a has substantially frustoconical first and second portions 21, 21a which are inwardly adjacent to the platforms 14, 14a and diverge in a direction away from the annular section 18, as considered in the axial direction of the sleeve 3, namely toward the front end face 3'''. The second annular section 18a further comprises third and fourth portions 20, 20a which alternate with the divergent portions 21, 21a, as considered in the circumferential direction of the sleeve 3, and are at least substantially parallel to each other (note FIG. 1). This ensures that, whereas the portions 21, 21a permit the sleeve 3 to rock in the plane of FIG. 3, the portions 20, 20a prevent rocking of the sleeve in the plane of FIG. 2, always in the region of the first annular section 18. The portions 20, 20a are or can be substantially parallel to each other. The portions 21 and 21a have a substantially semicircular outline and merge gradually into the portions 20, 20a.

The plane of FIG. 3 intersects and preferably halves the portions 21 and 21a of the second annular section 18a of the internal surface 8. The straight line 19 denotes in FIG. 1 the plane of FIG. 3; such plane is parallel to the axis 11 of the shaft 12 for the actuating fork 10. The extent of rocking movement of the sleeve 3 in one direction is indicated in FIG. 3 by the angle 20 which is a very small acute angle but suffices to ensure that the sleeve 3 can readily slide along the external surface 9a of the guide 9 even if the distance between the end face 3" and the plane of the platforms 14, 14a is not the same as that between the end face 3" and the motion transmitting portion of the surface of the arm 13 or 13a, i.e., even if the platform 14a and the respective arm 13a define a relatively narrow or even a rather wide gap 16. Such gap disappears as a result of the ability of the sleeve 3 to rock in the plane of the line 19, i.e., in the plane of FIG. 3.

The distance between the portions 20, 20a of the second annular section 18a of the internal surface 8 of the sleeve 3 matches or rather closely approximates the diameter of the external surface 9a (this prevents wobbling or rocking of the sleeve 3 in the plane of FIG. 2), and the distance between the portions 21, 21a of the annular section 18a increases gradually in a direction away from the annular section 18, i.e., in a direction from the section 18 toward the front end face 3''' of the sleeve 3. In other words, the portions 20 an 20a can guide the sleeve 3 without any wobbling in the plane of FIG. 2 but the portions 21, 21a of the second annular section 18a allow the sleeve 3 to rock to the extent which is necessary to ensure that the arms 13, 13a invariably contact the respective platforms 14, 14a when the fork 10 is called upon to shift the sleeve 3 in a direction to the left, as viewed in FIG. 2, in order to enable the inner race 5a of the bearing 2 to adequately displace and/or flex the prongs 4 of the diaphragm spring forming part of the friction clutch.

The feature that the axial length of the first annular section 18 is minimal and invariably a small fraction of the axial length of the second annular section 18a also contributes to the ability of the sleeve 3 to rock in the plane of FIG. 3 and to thus readily slide along the guide 9 as a result of simultaneous contact between the arms 13, 13a and the respective platforms 14, 14a. The annular clearance between the first annular section 18 and the external surface 9a is small or very small, namely barely sufficient to allow for rocking of the sleeve 3 in the plane of FIG. 3 to the extent which is necessary to invariably ensure that the arms 13, 13a can engage the respective platforms 14, 14a in order to shift the sleeve 3 in the axial direction of the guide 9 even if the arms 13, 13a are not aligned with utmost precision, even if the exposed surfaces of the platforms 14, 14a are not disposed in a common plane and/or even if the axis 11 is not exactly normal to the axis 15.

The distance between the first annular section 18 and the rear end face 3'' of the sleeve 3 is identical with or closely approximates that between the rear end face 3'' and the plane of the exposed surfaces 17, 17a of the platforms 14, 14a. This also enhances the aforediscussed ability of the sleeve 3 to rock in the plane of FIG. 3.

In order to reduce the likelihood of noise as a result of rocking movements of the sleeve 3 relative to the guide 9, the declutching device 1 can further comprise suitable spring clips 22, 22a which respectively couple the arms 13, 13a to the adjacent platforms 14, 14a. Such spring clips are shown in FIGS. 1 and 3 by broken lines; their function is to ensure that the motion transmitting portions of the arms 13, 13a are in permanent contact with the surfaces 17, 17a of the respective platforms 14, 14a. In other words, the spring clips 22, 22a ensure that the sleeve 3 is held in proper orientation relative to the guide 9 even before the shaft 12 begins to turn in a counterclockwise direction, as viewed in FIG. 2, in order to shift the sleeve 3 axially of the guide 9 and to thereby displace the prongs 4 of the diaphragm spring by way of the inner race 5a of the antifriction bearing 2. The spring clips 22, 22a automatically eliminate the gap 16 (if such gap tends to develop as a result of inaccuracies in the machining of the arms 13, 13a and/or for other reasons) even before the sleeve 3 begins to move axially of the guide 9 under the action of the fork 10.

FIG. 3 shows that the internal surface 8 of the sleeve 3 further includes a third annular section 18b which is separated from the second annular section 18a by the first annular section 18 and is a mirror image of the section 18a (with reference to a plane which is normal to the axis 15 and intersects the sleeve 3 in the region of the annular section 18). In other words, the third annular section 18b also comprises two substantially frustoconical portions corresponding to the portions 21, 21a of the second annular section 18a and ensuring that the sleeve 3 can rock in the plane of FIG. 3. The axial length of the third annular section 18b is but need not be a fraction of the axial length of the second annular section 18a but preferably exceeds the axial length of the first annular section 18.

FIGS. 2 and 3 further show that the internal surface 8 of the sleeve 3 can be formed with a circumferentially complete or circumferentially interrupted recess or cutout 31 which reduces the area of contact between the surfaces 8 and 9a and contributes to a pronounced reduction of friction between the sleeve 3 and the guide 9. The illustrated recess 31 is machined primarily into the second annular section 18a of the internal surface 8.

Figure 5:
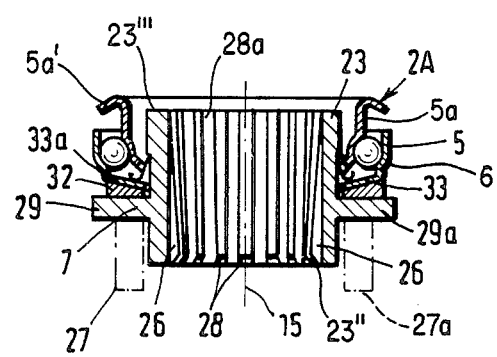
FIG. 5 is a horizontal sectional view as seen in the direction of arrows from the line V—V of FIG. 4.

FIGS. 4 and 5 illustrate a portion of a modified declutching device, namely a modified sleeve 23 which carries a somewhat modified antifriction bearing 2A. The internal surface 24 of the sleeve 23 has axially parallel grooves 25 which alternate with axially parallel teeth 26. The first annular section 28 of the internal surface 24 corresponds to the annular section 18 of the internal surface 8 and is defined by those portions of the top lands of teeth 26 which are disposed at the level of the arms 27, 27a of the actuating fork when such arms engage the motion receiving platforms 29, 29a of the flange 7 of the sleeve 23. The first annular section 28 of the internal surface 24 is staggered with reference to the motion receiving surfaces of the platforms 29, 29a, as considered in the axial direction of the sleeve 23. This is due to the fact that the annular section 28 is disposed at or very close to the rear end face 23'' of the sleeve 23.

The configuration of the second annular section 28a of the internal surface 24 of the sleeve 23 is analogous to that of the second annular section 18a of the internal surface 8. This is achieved in that the depth of certain grooves 25 decreases in a direction from the first annular section 28 toward the front end face 23''' of the sleeve 23, i.e., in a direction away from the first annular section 28. The depth of the grooves 25 decreases in the regions of the two platforms 29, 29a but does not decrease in the regions of the six and twelve o'clock positions of the sleeve 23, as viewed in FIG. 4. This ensures that the sleeve 23 can rock on the associated guide (not shown in FIGS. 4 and 5) in a plane which includes the straight line 19 of FIG. 4 and is normal to the plane of FIGS. 4 and 5 but that the sleeve 23 is held against rocking in the plane which includes the line 30 of FIG. 4 and is normal to the plane of FIG. 4. It can be said that the teeth 26 at the three and nine o'clock positions of FIG. 4 resemble wedges which taper from the first annular section 28 toward the front end face 23''' and that the taper of such wedges gradually decreases to zero as considered from the three and nine o'clock positions toward the six and twelve o'clock positions of FIG. 4. The taper of teeth 26 in the plane of the line 30 of FIG. 4 is zero or nearly zero.

The bearing 2A of the disengaging unit including the sleeve 23 is a so-called self-aligning or self-centering bearing. This means that the inner race 5a of this bearing can automatically assume an angular position in which its outwardly extending front flange 5a' contacts all prongs of the diaphragm spring in the friction clutch which is to be disengaged in response to upward movement of the sleeve 23, as viewed in FIG. 5. The outer race 5 of the bearing 2A is biased against the flange 7 of the sleeve 23 by the annular spring 6, and this outer race has an inwardly extending collar 33 having a convex or conical external surface 33a in contact with a complementary concave or conical surface provided on a ring-shaped insert 32 between the collar 33 and the flange 7. The insert 32 is movable (within limits) radially of the sleeve 23, the same as the collar 33 of the outer race 5. The spring 6 holds the insert 32 in frictional engagement with the flange 7 and simultaneously holds the collar 33 in frictional engagement with the insert 32 so that the outer race 5 does not rotate with reference to the sleeve 23. The provision of the insert 32 with its concave or conical surface and the provision of the collar 33 with its convex or conical surface 33a enables the entire bearing 2A to swivel relative to the sleeve 23 and to assume an optimum position for simultaneous engagement between the flange 5a' and all prongs of the diaphragm spring which is being acted upon by the inner race 5a when the sleeve 23 is moved upwardly, as viewed in FIG. 5, in order to disengage the friction clutch. In other words, the structure which is shown in FIG. 5 ensures automatic centering of the bearing 2A with reference to the diaphragm spring while simultaneously permitting appropriate orientation of the sleeve 23 with reference to its guide so as to ensure that each of the two arms 27, 27a can engage the respective motion receiving platform 29, 29a even if the fork and/or the sleeve is not machined with utmost precision and/or even if the fork and/or the sleeve undergoes thermally or otherwise induced deformation subsequent to machining and/or even if the arms 27, 27a and/or platforms 29, 29a undergo uneven wear for any one of a variety of different reasons.

The self-aligning bearing 2A of FIG. 5 can be used with equal advantage in the declutching device 1 of FIGS. 1 to 3, and the arms 27, 27a of FIG. 5 can be coupled to the respective platforms 29, 29a by clips 22, 22a or analogous resilient coupling means.

An important advantage of the improved declutching device is that the are 23 or 27 of the fork invariably engages the respective platform of the sleeve 3 or 23 simultaneously with the engagement of the arm 13a or 27a with the other platform of the respective sleeve. In other words, the sleeve 3 or 23 can change its orientation relative to the guide to the extent which is needed to enable the clamps 22, 22a to maintain the arms 13, 13a in permanent contact with the respective platforms 14, 14a and (if clamps are used) to maintain the arms 27, 27a in permanent contact with the respective platforms 29, 29a. Therefore, the sleeve 3 or 23 is not subject to further tilting during axial movement along the guide and the wear upon such sleeve and/or upon the guide is minimal. Moreover, the resistance which the sleeve offers to movement toward the prongs of the diaphragm spring is predictable during the entire useful life of the declutching device, and the same holds true for the resistance which the sleeve offers to and encounters during return movement to its starting position. It will be readily appreciated that the extent to which the sleeve 3 or 23 can rock relative to its guide is relatively small, as long as it suffices to compensate for the afore-discussed factors which are likely to cause the establishment of a gap between one of the arms and the respective platform of the sleeve. As a rule, the extent to which the sleeve must be free to rock relative to the guide will be reduced by reducing the axial length of the first annular section (18 or 28) of the internal surface of the sleeve.

The aforediscussed configuration of the second annular section 18a or 28a, namely in such a way that the sleeve 3 or 23 is free to rock in a predetermined plane including its axis and intersecting the platforms 14, 14a or 29, 29a but not in a plane which is normal to the predetermined plane, is particularly advantageous in motor vehicles wherein the axis 11 of the fork is horizontal and is located at a level below the axis of the sleeve. This will be readily appreciated by looking at FIG. 1 which shows that the portion 20 of the second annular section 18a of the internal surface 8 of the sleeve 3 prevents the latter from changing its orientation relative to the guide 9 by gravity and/or as a result of vibration or other stray movements which can develop when the vehicle is in motion. On the other hand, the sleeve 3 is invariably free to rock in the plane of FIG. 3 for the purpose of ensuring simultaneous contact between the arms 13, 13a and the respective platforms 14, 14a before the actuating fork 10 begins to shift the sleeve along the guide 9 in a direction to disengage the clutch by way of the inner race 5a of the antifriction bearing 2.

The aforementioned elastic clamps 22, 22a are desirable and advantageous but optional. Their primary function is to reduce the wear upon the arms 13, 13a and the sleeve 3 as well as to reduce noise which could develop as a result of a tilting or rocking of the sleeve in response to each pivoting of the fork in a direction to initiate a disengagement of the clutch.

The improved sleeve, especially the sleeve 3 of FIGS. 1 to 3, can be mass-produced at a reasonable cost because its internal surface can be machined with a high degree of precision in existing machine tools. This is due to the fact that the portions 21, 21a of the second annular section 18a (and the corresponding portions of the third annular section 18b) have a substantially semicircular outline and the portions 20, 20a are substantially flat and are disposed at a constant distance from one another. Such configuration of the second annular section 18a and of the third annular section 18b is especially advantageous when the external surface 9a of the guide 9 is a cylinder having a constant diameter. The first annular section 18 preferably constitutes a truly cylindrical surface whose diameter only slightly exceeds the diameter of the external surface 9a. The same preferably applies for the first annular section 28 of the internal surface 24 of the sleeve 23 shown in FIGS. 4 and 5.

It is presently preferred to select the position of the first annular section of the internal surface of the sleeve in a manner as shown in FIG. 3, namely so that the distance between the adjacent end face of the sleeve and the first annular section is the same as or closely approximates that between such end face and the exposed surfaces of the respective platforms. On the other hand, machining of the sleeve 23 is less expensive because the first annular section 28 of the internal surface 24 is adjacent to the end face 23'' and the machining of a third annular section (such as the section 18b of the internal surface 8) can be dispensed with. The sleeve 23 of FIGS. 4 and 5 can be mass-produced from a suitable synthetic plastic material, for example, by resorting to an injection molding technique. The same holds true for the sleeve 3, especially if the latter is to be formed with the internal recess 31. It is often sufficient if the grooves 25 are machined only into the first annular section 28 or only into the second annular section 28a of the internal surface 24 of the sleeve 23. Such grooves serve the same purpose as the recess 31, i.e., they reduce the area of contact between the sleeve and its guide.

The provision of a self-centering or self-aligning bearing (such as the bearing 2A of FIG. 5) also constitutes an optional but highly advantageous feature of the improved declutching device. As mentioned above, such bearing ensures that each and every prong of the diaphragm spring in the clutch is engaged by the flange 5a' of the inner race 5a when the sleeve 23 is moved forwardly (upwardly, as viewed in FIG. 5) in order to disengage the clutch. The provision of a self-aligning bearing further ensures that the stresses which develop during disengagement of the clutch are distributed at least substantially uniformly along the entire circumference of the sleeve. Still further, the utilization of such self-aligning bearing reduces the wear upon the diaphragm spring and upon the component parts of the bearing.

The ring-shaped insert 32 of FIG. 5 can be omitted if the flange 7 of the sleeve 23 is formed with a concave surface which is complementary to and abuts against the convex surface 33a of the outer race 33. Alternatively, the insert 32 can be retained and the self-centering or self-aligning action of the bearing 2A can be enhanced still further by providing the insert 32 with a convex surface which abuts against a complementary concave surface of the flange 7.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A declutching device, especially for clutches of motor vehicles, comprising an elongated guide having an external surface of unchanging contour, as considered in the longitudinal direction of said guide; a disengaging unit including a sleeve having an axis and being movable longitudinally of said guide, said sleeve having two motion receiving portions disposed substantially diametrically opposite each other and an internal durface surrounding said guide with freedom of rocking movement substantially exclusively in a predetermined plane including the axis of said sleeve and intersecting said motion receiving portions and without freedom of rocking movement in a second plane which includes the axis of said sleeve and is normal to said predetermined plane, said internal surface including a first section closely adjacent to the external surface of said guide and said sleeve having a portion which is adjacent to and is maintained by said first section in a predetermined position in the radial direction of the guide, said internal surface further including a second section adjacent to said first section, said second section having first and second portions which diverge axially of said sleeve and in a direction away from said first section and nondivergent third and fourth portions alternating with said first and second portions, said considered in the circumferential direction of said external surface, said predetermined plane intersecting the first and second portions of said second section; and actuating means including two arms arranged to move said sleeve axially by way of said motion receiving portions.

2. The device of claim 1, wherein said actuating means is pivotable about an axis which is at least substantially normal to the axis of said sleeve and said arms straddle said guide.

3. The device of claim 1, wherein said unit further comprises an antifriction bearing including a first race non-rotatably mounted on said sleeve, a second race rotatable with reference to said first race, and antifriction rolling elements between said races.

4. The device of claim 1, wherein said guide is a tubular member.

5. The device of claim 1, wherein said predetermined plane substantially halves the first as well as the second portion of said second section.

6. The device of claim 1, wherein said sleeve is rockable with reference to said guide in the region of said first section.

7. The device of claim 1, wherein the first and second portions of said second section constitute parts of a conical frustum and the distance between the third and fourth portions of said second section is substantially constant.

8. The device of claim 7, wherein said internal surface has portions adjacent to the third and fourth portions of said second section and the configuration of the third and fourth portions of said second second substantially conforms to the contour of said adjacent portions of said external surface.

9. The device of claim 1, wherein the first and second portions of said second section each have a substantially semicircular cross-sectional outline and the third and fourth portions of said second section are substantially flat and substantially parallel to one another.

10. The device of claim 1, wherein said external surface has a circular contour and the axial length of said first section is a small fraction of the axial length of said second section.

11. The device of claim 1, wherein said sleeve has an end face and the distance between said end face and said first section at least approximates the distance between said end face and said motion receiving portions, as considered in the axial direction of said sleeve.

12. The device of claim 1, wherein said internal surface, has a third section and said first section is disposed between said second and third sections, said third section having first and second portions diverging in a direction away from said first section, as considered axially of said sleeve, and said redetermined plane intersecting each of said portions of said third section.

13. The device of claim 1, wherein said first section is grooved.

14. The device of claim 1, wherein the third and fourth portions of said second section are grooved.

15. The device of claim 1, wherein at least one of said sections has axially parallel grooves.

16. The device of claim 1, wherein said disengaging unit further comprises a self-centering antifriction bearing mounted on said sleeve.

17. The device of claim 1, wherein said disengaging unit further comprises an antifriction bearing including a race having freedom of swiveling movement with reference to said sleeve.

18. The device of claim 17, wherein said race has a convex annular surface and is movable radially of said sleeve, said sleeve having a complementary concave surface abutting against said convex surface.

19. The device of claim 17, wherein said race has an annular surface and is movable radially of said sleeve and further comprising a ring-shaped insert abutting against said sleeve and having an annular surface contacting the surface of said race, one of said annular surfaces being convex and the other of said annular surfaces being concave.

* * * * *